United States Patent
Jacobson (10) Patent No.: US 10,852,169 B2
(45) Date of Patent: Dec. 1, 2020

(54) ULTRASONIC FLOWMETER AND METHOD OF CONTROLLING AN ULTRASONIC FLOWMETER BY SIMULTANEOUSLY DRIVING A PAIR OF TRANSDUCERS WITHOUT CORRELATION

(71) Applicant: TRANSUS INSTRUMENTS PTY LTD, Rotterdam (NL)

(72) Inventor: Saul Abraham Jacobson, South Hobart (AU)

(73) Assignee: Transus Instruments Pty Ltd, Rotterdam (NL)

( * ) Notice: Subject to any disclaimer, the term of this patent is extended or adjusted under 35 U.S.C. 154(b) by 57 days.

(21) Appl. No.: 15/512,777

(22) PCT Filed: Sep. 18, 2015

(86) PCT No.: PCT/NL2015/000032
§ 371 (c)(1),
(2) Date: Mar. 20, 2017

(87) PCT Pub. No.: WO2016/048135
PCT Pub. Date: Mar. 31, 2016

(65) Prior Publication Data
US 2017/0241818 A1    Aug. 24, 2017

(30) Foreign Application Priority Data

Sep. 21, 2014 (NL) ..................................... 1040960
Jan. 8, 2015 (NL) ..................................... 1041139

(51) Int. Cl.
*G01F 1/66* (2006.01)
*G01F 1/708* (2006.01)
*G01F 1/712* (2006.01)

(52) U.S. Cl.
CPC ............ *G01F 1/667* (2013.01); *G01F 1/7082* (2013.01); *G01F 1/712* (2013.01)

(58) Field of Classification Search
None
See application file for complete search history.

(56) References Cited

U.S. PATENT DOCUMENTS 4,787,252 A * 11/1988 Jacobson .................. G01F 1/66
  73/861.28
5,650,571 A    7/1997 Freud et al.
(Continued)

FOREIGN PATENT DOCUMENTS

EP    0 006 464 A2    1/1980
EP    0 312 224 A1    4/1989
(Continued)

*Primary Examiner* — Harshad R Patel
(74) *Attorney, Agent, or Firm* — Schroeder Law PC (57) ABSTRACT

A method to control an ultrasonic flowmeter, the ultrasonic flowmeter including a pipe segment; a first pair of transducers defining a first ultrasonic path; and a second pair of transducers defining a second ultrasonic path is provided. The method includes: a) transmitting a first code along the first ultrasonic path; b) simultaneously transmitting a second code along the second ultrasonic path, wherein the first and second code are non-correlated; c) receiving a first ultrasonic signal by the first pair of transducers; d) receiving a second ultrasonic signal by the second pair of transducers; e) correlating the transmitted first code with the first ultrasonic signal; and f) correlating the transmitted second code with the second ultrasonic signal.

31 Claims, 4 Drawing Sheets (56) References Cited

U.S. PATENT DOCUMENTS

| | | | |
|---|---|---|---|
| 6,435,038 B1 * | 8/2002 | Nam | G01F 1/667 73/861.27 |
| 6,788,204 B1 * | 9/2004 | Ianelli | G06K 19/0675 310/313 R |
| 7,117,104 B2 * | 10/2006 | Urdaneta | G01F 1/66 702/48 |
| 2011/0301878 A1 | 12/2011 | Romanov et al. | |
| 2015/0260842 A1 * | 9/2015 | Susumu | G01S 15/8959 367/93 |

FOREIGN PATENT DOCUMENTS

| | | |
|---|---|---|
| EP | 2 339 301 A1 | 6/2011 |
| GB | 2 056 064 A | 3/1981 |
| GB | 2 423 363 A | 8/2006 |
| WO | WO 2012/123673 A1 | 9/2012 |

* cited by examiner

ULTRASONIC FLOWMETER AND METHOD OF CONTROLLING AN ULTRASONIC FLOWMETER BY SIMULTANEOUSLY DRIVING A PAIR OF TRANSDUCERS WITHOUT CORRELATION

The invention relates to a method for controlling an ultrasonic flowmeter, an ultrasonic flowmeter and a flow system comprising one or more ultrasonic flowmeters.

Ultrasonic flowmeters typically have two or more ultrasonic paths, each ultrasonic path being defined by a pair of ultrasonic transducers. Flow characteristics can be determined from the upstream and downstream transit times of ultrasonic waves along each ultrasonic path, wherein transit time is defined as being the time period it takes for an ultrasonic wave to travel between a respective pair of transducers.

In prior art ultrasonic flowmeters, the transit times for each ultrasonic path are measured sequentially. Hence, in a prior art example an ultrasonic signal is first transmitted upstream on a first ultrasonic path, then transmitted downstream on the first ultrasonic path, after which the respective transit times and the difference therebetween are calculated and subsequently this process is repeated until all ultrasonic paths have been measured. This measuring sequence is then started again at the first ultrasonic path.

A drawback of the prior art ultrasonic flowmeters is that it may take a while before all transit times on all ultrasonic paths have been measured. This drawback gets even worse when ultrasonic paths are added to increase the accuracy of the ultrasonic flowmeter. This negative effect makes it difficult to accurately measure dynamic flow conditions.

To keep the measuring sequence as short as possible, existing flowmeters transmit a short ultrasonic signal. Examples thereof are a single pulse, a short pulse burst of a short encoded transmit signal. In an attempt to further shorten the measuring sequence, it is disclosed in EP2.339.301 to simultaneously transmit an ultrasonic signal upstream and downstream of an ultrasonic path and to stop transmitting before the ultrasonic signal reaches the other transducer. This allows to simultaneously determine the upstream and downstream transit times and saves time.

However, a drawback of using a short ultrasonic signal is that the signal is susceptible to noise. The effect of the noise can then be reduced by increasing the amplitude of the ultrasonic signal, e.g. by using relatively high voltages for driving the respective ultrasonic transducers.

It is therefore an object of the invention to provide an improved ultrasonic flowmeter which has a faster response, has an improved signal-to-noise ratio and/or has an improved immunity to acoustic noise and/or electrical noise.

This object is achieved by a method to control an ultrasonic flowmeter, wherein the ultrasonic flowmeter comprises:
  a pipe segment to receive a flow therethrough;
  a first pair of transducers defining a first ultrasonic path in the pipe segment to be subjected to the flow; and
  a second pair of transducers defining a second ultrasonic path in the pipe segment to be subjected to the flow, wherein the second ultrasonic path is different from the first ultrasonic path,
and wherein the method comprises the following steps:
  a) driving a transducer of the first pair of transducers to transmit a first code;
  b) receiving a first ultrasonic signal at the other transducer of the first pair of transducers;
  c) simultaneously driving a transducer of the second pair of transducers to transmit a second code, wherein the first code and the second code are non-correlated to each other;
  d) receiving a second ultrasonic signal at the other transducer of the second pair of transducers;
  e) correlating the transmitted first code with the first ultrasonic signal; and
  f) correlating the transmitted second code with the second ultrasonic signal.

The advantage of the method according to the invention is that the first and second code are transmitted simultaneously, so that the first and second ultrasonic path are operated together resulting in a faster response and possibly in the ability to measure dynamic flow conditions. The first and second ultrasonic path can be operated simultaneously without introducing significant interference between the first and second ultrasonic path when the first and second code are non-correlated to each other. Hence, when the transmitted first code is correlated with the first ultrasonic signal and the first ultrasonic signal also comprises traces of the second code, the effect thereof is substantially cancelled out during correlation.

In an embodiment, the first ultrasonic path defines a first transit time being the time period for an ultrasonic wave to travel between the first pair of transducers, wherein the second ultrasonic path defines a second transit time being the time period for an ultrasonic wave to travel between the second pair of transducers, and wherein the first and second code are transmitted for a period of time equal to at least the largest of the first and second transit times, preferably for a period of time equal to at least twice the largest of the first and second transit times, more preferably for a period of time equal to at least triple the largest of the first and second transit times.

Due to the simultaneous operation of ultrasonic paths, there is no longer a need to use short ultrasonic signals. Using longer codes improves the effective signal-to-noise ratio, which in turn allows to use lower amplitude and thus lower voltages for the ultrasonic transducers. Using lower amplitudes/voltages may result in Intrinsically Safe operation and certification. Using longer codes further results in an increased immunity to acoustic noise, e.g. valve noise, and/or electrical noise, e.g. electromagnetic interference.

In an embodiment, the first code is a part of a maximum length sequence code, and the second code is another part of the same maximum length sequence code, preferably not overlapping with the part of the maximum length sequence code forming the first code.

In an embodiment, the same maximum length sequence code is used for the first and second code, wherein the maximum length sequence code for the second code is delayed in time such that the first and second codes do not overlap during the period that the ultrasonic signal may be received by the receiving transducers. Hence, the second code is the same maximum length sequence code delayed sufficiently to avoid overlapping of the first and second code during a measurement period of interest.

The advantage of using a maximum length sequence code is that the autocorrelation of a maximum length sequence code is 1 for zero-lag and nearly zero, namely 1/N where N is the sequence length, for all other lags. Hence, the larger the sequence length, the more the autocorrelation approaches unit impulse function or Kronecker delta function.

In an embodiment, the first code is an extended maximum length sequence code consisting of a single maximum length sequence extended in the beginning by the last n elements of the maximum length sequence and in the end by the first n elements of the maximum length sequence, and wherein the second code is the same maximum length sequence delayed sufficiently to avoid overlapping of the first and second code during a measurement period of interest and similarly extended in the beginning and end, and wherein the first and second ultrasonic signal are correlated with respectively the transmitted first and second code without the extensions.

When the first ultrasonic path defines a first transit time being the time period for an ultrasonic wave to travel between the first pair of transducers, and the second ultrasonic path defines a second transit time being the time period for an ultrasonic wave to travel between the second pair of transducer, n is preferably chosen such that a time to transmit n elements of the first or second code exceeds a predetermined time period defining a desired difference between minimum and maximum values of the first and second transit times.

In an embodiment, the first code is an extended maximum length sequence code consisting of a single first maximum length sequence extended in the beginning by the last n elements of the first maximum length sequence and in the end by the first n elements of the first maximum length sequence, and wherein the second code is another extended maximum length sequence code consisting of a single second maximum length sequence different from the first maximum length sequence and extended in the beginning by the last p elements of the second maximum length sequence and in the end by the first p elements of the second maximum length sequence, and wherein the first and second ultrasonic signal are correlated with respectively the transmitted first and second code without the extensions.

When the first ultrasonic path defines a first transit time being the time period for an ultrasonic wave to travel between the first pair of transducers, and the second ultrasonic path defines a second transit time being the time period for an ultrasonic wave to travel between the second pair of transducer, n and p are preferably chosen such that a time to transmit n elements of the first code and a time to transmit p elements of the second code exceed a predetermined time period defining a desired difference between minimum and maximum values of the first and second transit times.

An advantage of using extended maximum length sequence codes is that it is possible to have the property of an autocorrelation of 1/N for lags other than zero-lag in a predetermined measurement range corresponding to the difference between minimum and maximum values of the first and second transit times without having to use relatively long, i.e. continuous or semi-continuous signals.

In an embodiment, the first code is a maximum length sequence code or part thereof, and the second code is another maximum length code or part thereof, for instance by using different code masks for a maximal linear feedback shift register generating the maximal length sequence code and/or by using different code lengths for the first and second code. Using different codes allows to further reduce the interference between paths compared to using identical, but delayed codes.

In an embodiment, the correlation functions of successive transmissions on a path are averaged to reduce the interference between paths. To further reduce the interference, the maximum length sequence code used for the first and/or second code is different for successive transmissions on a path. This will randomize the sidelobes of the correlation function and interference so it will tend to cancel over time.

In an embodiment, the first and second codes are formed by pairs of sequences that have the property that their out-of-phase aperiodic autocorrelation coefficients sum to zero. This is a further improvement compared to the 1/N sidelobes when using a maximum length sequence code.

In an embodiment, the pair of sequences forming the first code and the pair of sequences forming the second code are different from each other and preferably selected such that the cross correlations between respective pairs of sequences sum to zero.

In an embodiment, the transmitted first code, the first ultrasonic signal, the transmitted second code and the second ultrasonic signal are first digitized into three levels −1, 0 and +1 prior to correlating. This has the advantage that the signals can be represented by two bits. As the signals have only levels of −1, 0 and +1, the product of the required multiplication operation for correlating becomes an inversion of the multiplier input, zero or the multiplier input itself, respectively. This reduces the required computational power and speed, so that for instance low cost, low power FPGA's can be used for performing the method.

Further, digitizing the signals in this manner can be done using two comparators and thus makes the use of high cost, high power analog-to-digital converters superfluous.

In an embodiment, the direction of transmission along the first and/or second ultrasonic path is alternated periodically. This has the advantage that the systematic offsets in the time difference measurement between upstream and downstream transit times are reduced, preferably eliminated.

The invention also relates to an ultrasonic flowmeter comprising:
  a pipe segment to receive a flow;
  a first pair of transducers defining a first ultrasonic path in the pipe segment to be subjected to the flow;
  a second pair of transducers defining a second ultrasonic path in the pipe segment to be subjected to the flow, wherein the second ultrasonic path is different from the first ultrasonic path; and
  a controller to control the first and second pair of transducers,
wherein the controller is configured to drive a transducer of the first pair of transducers with a first code and simultaneously drive a transducer of the second pair of transducers with a second code, wherein the first code and the second code are not correlated to each other.

In an embodiment, the first ultrasonic path defines a first transit time being the time period for an ultrasonic wave to travel between the first pair of transducers, wherein the second ultrasonic path defines a second transit time being the time period for an ultrasonic wave to travel between the second pair of transducers, and wherein the controller is configured to transmit the first and second code for a period of time equal to at least the largest of the first and second transit times, preferably for a period of time equal to at least twice the largest of the first and second transit times, more preferably for a period of time equal to at least triple the largest of the first and second transit times.

In an embodiment, the first code is a part of a maximum length sequence code, and the second code is another part of the same maximum length sequence code, preferably not overlapping with the part of the maximum length sequence code forming the first code.

In an embodiment, the same maximum length sequence code is used for the first and second code, wherein the maximum length sequence code for the second code is delayed in time such that the first and second codes do not overlap during the period that the ultrasonic signal may be received by the receiving transducers. Hence, the second code is the same maximum length sequence code delayed sufficiently to avoid overlapping of the first and second code during a measurement period of interest.

In an embodiment, the first code is an extended maximum length sequence code consisting of a single maximum length sequence extended in the beginning by the last n elements of the maximum length sequence and in the end by the first n elements of the maximum length sequence, wherein the second code is the same maximum length sequence delayed sufficiently to avoid overlapping of the first and second code during a measurement period of interest and similarly extended in the beginning and end, and wherein the controller is configured to correlate a first ultrasonic signal received at the other transducer of the first pair of transducers with the transmitted first code without the extensions, and to correlate a second ultrasonic signal received at the other transducer of the second pair of transducers with the transmitted second code without the extensions.

When the first ultrasonic path defines a first transit time being the time period for an ultrasonic wave to travel between the first pair of transducers, and the second ultrasonic path defines a second transit time being the time period for an ultrasonic wave to travel between the second pair of transducer, n is preferably chosen such that a time to transmit n elements of the first or second code exceeds a predetermined time period defining a desired difference between minimum and maximum values of the first and second transit times.

In an embodiment, the first code is a maximum length sequence code or part thereof, and the second code is another maximum length sequence code or part thereof.

In an embodiment, the first code is an extended maximum length sequence code consisting of a single first maximum length sequence extended in the beginning by the last n elements of the first maximum length sequence and in the end by the first n elements of the first maximum length sequence, wherein the second code is another extended maximum length sequence code consisting of a single second maximum length sequence different from the first maximum length sequence and extended in the beginning by the last p elements of the second maximum length sequence and in the end by the first p elements of the second maximum length sequence, and wherein the controller is configured to correlate a first ultrasonic signal received at the other transducer of the first pair of transducers with the transmitted first code without the extensions, and to correlate a second ultrasonic signal received at the other transducer of the second pair of transducers with the transmitted second code without the extensions.

When the first ultrasonic path defines a first transit time being the time period for an ultrasonic wave to travel between the first pair of transducers, and the second ultrasonic path defines a second transit time being the time period for an ultrasonic wave to travel between the second pair of transducer, n and p are preferably chosen such that a time to transmit n elements of the first code and a time to transmit p elements of the second code exceed a predetermined time period defining a desired difference between minimum and maximum values of the first and second transit times.

In an embodiment, the first and second codes are formed by pairs of sequences that have the property that their out-of-phase aperiodic autocorrelation coefficients sum to zero.

In an embodiment, the pair of sequence forming the first code and the pair of sequence forming the second code are different from each other and preferably selected such that the cross correlations between respective pairs of sequences sum to zero.

In an embodiment, the controller is further configured to digitize the transmitted first code, the first ultrasonic signal, the transmitted second code and the second ultrasonic signal first into three levels −1, 0 and +1 prior to correlating.

In an embodiment, the controller is further configured to periodically alternate a direction of transmission on the first and/or second ultrasonic path.

The invention further relates to a flow system including one or more ultrasonic flowmeters according to the invention.

The invention will now be described in a non-limiting way by reference to the drawings in which like parts are indicated by like reference symbols, and in which.

Figure 1:
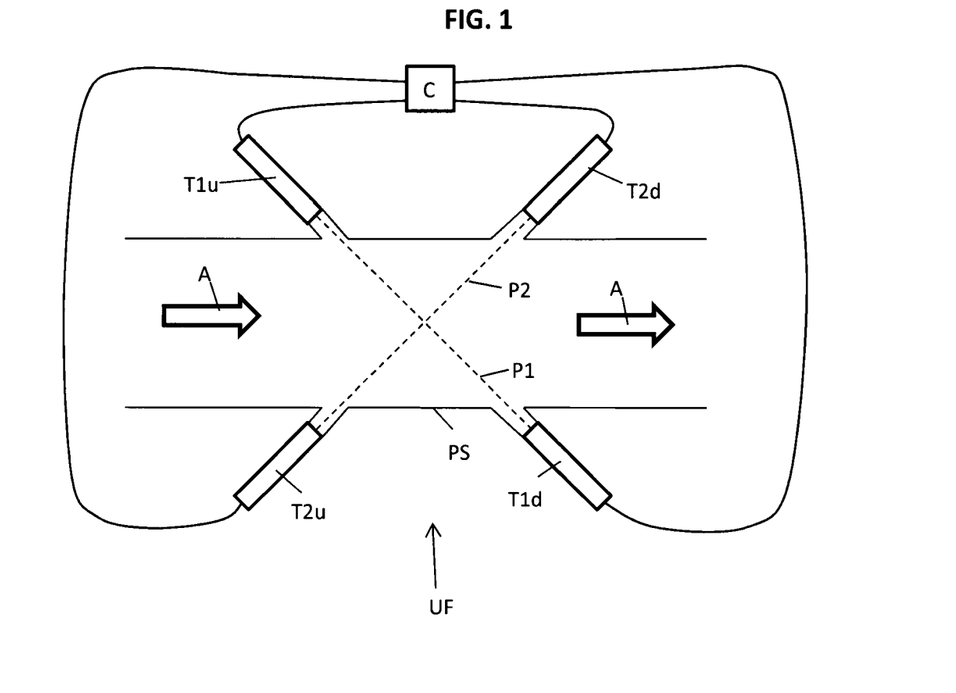
FIG. 1: depicts schematically an ultrasonic flowmeter according to an embodiment of the invention.

FIG. 1 depicts an ultrasonic flowmeter UF according to an embodiment of the invention. The ultrasonic flowmeter UF comprises a pipe segment PS to receive a flow indicated here by arrows A. The pipe segment PS may be assembled into the main pipe of a flow system, so that the pipe segment PS receives the main flow, but the pipe segment PS may also be arranged parallel to the main pipe of the flow system, so that only a portion of the flow is received by the pipe segment PS.

Although the flow is indicated to be directed from left to right in FIG. 1, this direction is not essential for the invention and thus the invention can also be applied to the configuration in which the flow is in the opposite direction through the pipe segment PS.

The ultrasonic flowmeter UF further comprises a first pair of ultrasonic transducers T1$d$, T1$u$, where T1$d$ refers to the downstream ultrasonic transducer and T1$u$ refers to the upstream ultrasonic transducer. The first pair of ultrasonic transducers T1$d$, T1$u$ defines a first ultrasonic path P1 in the pipe segment PS between the upstream ultrasonic transducers T1$u$ and the downstream ultrasonic transducer T1$d$ to be subjected to the flow.

The ultrasonic flowmeter further comprises a second pair of ultrasonic transducers T2$d$, T2$u$, where T2$d$ refers to the downstream ultrasonic transducer and T1$u$ refers to the upstream ultrasonic transducers. The second pair of ultrasonic transducers T2$d$, T2$u$ defines a second ultrasonic path P2 in the pipe segment PS between the upstream ultrasonic transducers T2$u$ and the downstream ultrasonic transducer T2$d$ to be subjected to the flow.

The ultrasonic transducers T1d, T1u, T2d, T2u are all connected to a controller C, which controller is configured to drive an ultrasonic transducer T1d or T1u of the first pair of transducers to transmit a first code and to simultaneously drive an ultrasonic transducer T2d or T2u of the second pair of transducers to transmit a second code, wherein the first and second code are non-correlated.

The controller C is further configured to measure a first ultrasonic signal at the other ultrasonic transducer of the first pair of transducers and to measure a second ultrasonic signal at the other ultrasonic transducer of the second pair of transducers.

In principle, the first code is transmitted along the first ultrasonic path and the second code is transmitted along the second ultrasonic path resulting in the first ultrasonic signal being the received response of the transmitted first code and the second ultrasonic signal being the received response of the transmitted second code. However, due to undesired reflections and other phenomena, the first ultrasonic signal may also comprise a portion that originates from the transmitted second code and the second ultrasonic signal may also comprise a portion that originates from the transmitted first code. This is referred to as interference between the first and second ultrasonic path and is normally the reason why transmissions along different ultrasonic paths are carried out at different moments in time and not simultaneously.

However, as the first and second code are non-correlated, the received responses of respectively the transmitted first and second code are also not correlated. Hence, when the first ultrasonic signal is correlated with the transmitted first code by the controller, the portion of the first ultrasonic signal based on the second code will have a minimal or even zero contribution. The same applies when the second ultrasonic signal is correlated with the transmitted second code by the controller. The portion of the second ultrasonic signal based on the first code will have a minimal or even zero contribution. Hence, the interference is minimized by using non-correlated codes allowing to transmit simultaneously along different ultrasonic paths.

Although the example of FIG. 1 only depicts two ultrasonic paths, the invention can be applied to as many ultrasonic paths as possible. In case the ultrasonic flowmeter comprises a third pair of ultrasonic transducers defining a third ultrasonic path in the pipe segment to be subjected to the flow, the controller is configured to transmit a third code along the third ultrasonic path, which third code is non-correlated to the first code and non-correlated to the second code. This can be extended to as many ultrasonic paths as required. Hence, the time it takes to measure a characteristic of the flow becomes more or less independent of the number of ultrasonic paths.

In this specification, non-correlated means that the correlation coefficient between two signals is at most 0.5 for all lags, preferably at most 0.3, more preferably at most 0.1 and most preferably at most 1/N, where N is the sequence length of the signals.

Correlation function is referred to as the correlation coefficient as function of lag. After determining the correlation function of the first ultrasonic signal and the transmitted first code and after determining the correlation function of the second ultrasonic signal and the transmitted second code, the transit times along respectively the first and second ultrasonic path can be found by determining the lag for which the correlation coefficient is maximal, preferably close to 1 or −1.

In an embodiment, a maximum length sequence code is used to produce the first and second code, which in turn may be used to phase modulate a respective transmitted signal along the first and second ultrasonic path.

A maximum length sequence is a type of pseudorandom binary sequence that can be generated using maximal linear feedback shift registers. Maximal linear feedback shift registers are periodic and produce every binary number that can be represented by the shift registers except for the zero vector. Hence, for length m registers they produce a sequence of length $2^m-1$. In an embodiment, a Fibonacci implementation of the linear feedback shift register is used, but other implementations are also envisaged.

Figure 2:
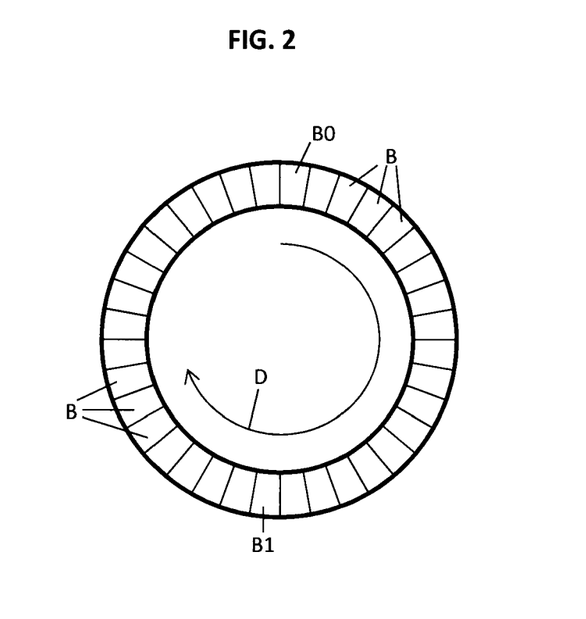
FIG. 2: depicts visually a cyclic maximal length sequence code.

As the generated sequence is repeated, the cyclic maximal length sequence may be visually represented by the circular figure in FIG. 2 in which each block B represents a different binary number and the arrow D depicts the direction in which the linear feedback shift registers generates the binary numbers. For simplicity reasons, not all blocks in FIG. 2 have been denoted by reference symbol B. The order of the binary numbers B is determined by the so-called code mask, which may also be referred to as feedback polynomial, which is representative for how a subsequent binary number is generated based on a previous binary number.

When the cyclic maximal length sequence of FIG. 2 is used for the ultrasonic flowmeter of FIG. 1, it is possible to obtain two codes that are non-correlated by using two identical maximal linear feedback shift registers which start at different points in the cyclic maximal length sequence such that the two parts of the cyclic maximal length sequence used to generate the first and second code do not overlap during measurement period of interest.

For instance, as indicated in FIG. 2, the first code may start at B0, while the second code may start at B1. In order that the codes do not overlap, it is necessary that the delay from B0 to B1, and from B1 to B0 as the codes are cyclic, exceeds the measurement period of interest.

The desired length of the cyclic maximal length sequence may be determined by the measurement period of interest, the required delay between B0 and B1, the used chip count and the frequency of the transmitted signal.

The measurement period of interest may be determined by the transit times of the ultrasonic path. In FIG. 1, the first ultrasonic path P1 defines a first transit time being the time period for an ultrasonic wave to travel between the first pair of transducers T1d, T1u. The first transit time can be determined using a length of the first ultrasonic path P1 and the sound of speed in the flow through the pipe segment. If for instance the length of the first ultrasonic path P1 is 300 mm and the sound of speed is approx. 333 m/s, the first transit time is about 900 µs. The second ultrasonic path P2 defines a second transit time being the time period for an ultrasonic wave to travel between the second pair of transducers T2d, T2u. The second transit time can be determined using a length of the second ultrasonic path P2 and the sound of speed in the flow through the pipe segment. If for instance the length of the second ultrasonic path P1 is also 300 mm, the second transit time is about 900 µs as well. The measurement period of interest may be at least the largest of the first and second transit times. In the above examples, the measurement period of interest is thus at least 900 µs. However, the measurement period of interest may also be chosen to be twice or even triple the largest of the first and second transit time, so that there is enough time for the measurement and subsequent measurements do not interfere with each other. Hence, the measurement period of interest may be three times the 900 µs transit time which equals 2.7 ms.

The chip count is the number of transmit cycles per code bit. Typical chip counts are in the order of 1-4.

The frequency of the transmitted signal may be in the range of 20 kHz-20 MHz.

Assuming a triple transit time as measurement period of interest of 2.7 ms, a chipcount of 1, and a frequency of the transmitted signal of 500 kHz, the minimum length of the cyclic maximal length sequence needs to be 1350 bits times the number of ultrasonic paths in case no overlap is allowed.

As the number of bits of a cyclic maximal length sequence is determined by $(2^m-1)$, where m is the number of bits of a single binary number, m can be determined if the number of ultrasonic paths is known. In this example, where the number of ultrasonic paths is two, m should at least be twelve. When for instance the number of ultrasonic paths is changed to four, the cyclic maximal length sequence in case of m=12 is not long enough to obtain four codes that do not overlap. Hence, if no measures are taken, the interference between ultrasonic paths may increase. Possible measures to take are:

increase m, the number of bits in the register, to twelve instead of eleven;
increase the chipcount from one to two;
reduce the frequency of the transmitted signal with approximately a factor two; or
reduce the measurement period of interest by a factor of approximately two.

Adapting m and/or the chipcount is preferred as this can be done easily in for instance software and has no impact on the hardware.

In the embodiment of FIG. 2, the first and second code for respectively the first and second ultrasonic path are generated from a single maximal length sequence. In another embodiment, the first code is generated from a first maximal length sequence and the second code is generated from a second maximal length sequence that is different from the first maximal length sequence. The second maximal length sequence may be different due to a difference code mask or due to a different number of bits in the register, i.e. the length of the binary numbers is different.

In an embodiment, correlation results from successive transmissions on an ultrasonic path are combined to find an average result. If this is the case, it may be advantageous to use different codes for the successive transmissions as this will substantially randomize the interference and non-zero sidelobes of the correlation function resulting in an improved accuracy.

In another embodiment, each of the first and second code is formed by a pair of sequences that have the property that their out-of-phase aperiodic autocorrelation coefficients sum to zero. Hence, the pair of sequences are transmitted together along the corresponding ultrasonic path as the first code and subsequently split after receiving the response, such that the correlation functions of the pair of sequences can be combined. The pair of sequences may be Golay Complimentary Codes.

As an example, the first code may be formed by an A1 sequence and a B1 sequence together forming a first pair of sequences, wherein the A1 sequence may be the following bit sequence:
0100100010111000
and wherein the B1 sequence may be the following bit sequence:
1011011110111000

Figure 3A:
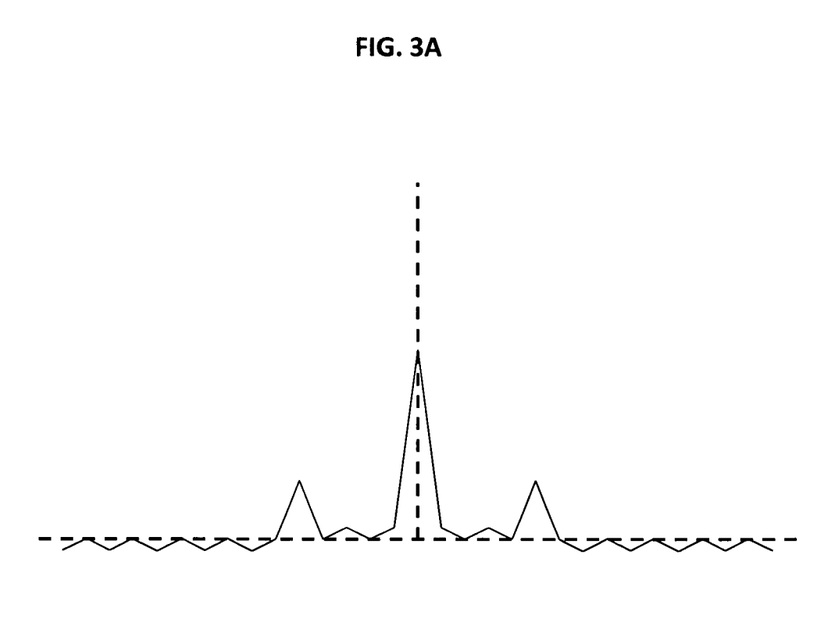
FIG. 3A: depicts an autocorrelation function for a first code.
Figure 3B:
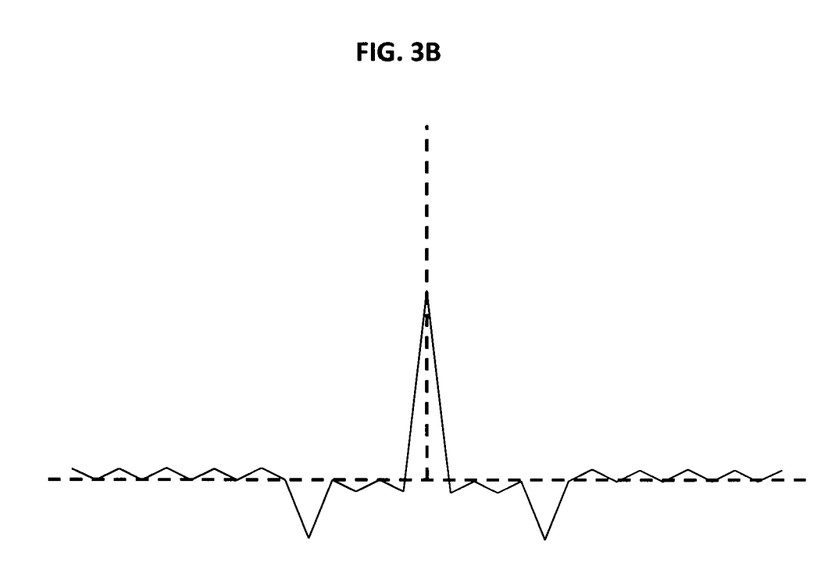
FIG. 3B: depicts an autocorrelation function for a second code.
Figure 3C:
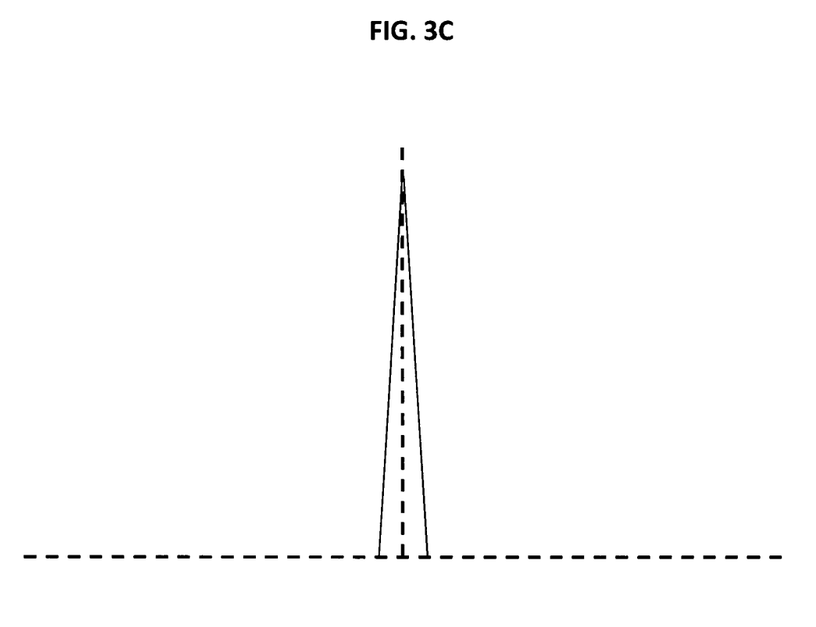
FIG. 3C: depicts the sum of the autocorrelation functions of FIG. 3A and FIG. 3B.

FIG. 3A depicts the autocorrelation function of the A1 sequence. FIG. 3B depicts the autocorrelation function of the B1 sequence. FIG. 3C depicts the sum of the autocorrelation functions of FIG. 3A and FIG. 3B. As can be seen, the sum in FIG. 3C shows a clear maximum at zero lag and zero sidelobes for all other lags.

The second code may also be formed by an A2 sequence and a B2 sequence together forming a second pair of sequences, wherein the A2 sequence may be the following bit sequence:
1011011110111000
and wherein the B2 sequence may be the following bit sequence:
1011011101000111

These A2 and B2 sequences have the same property as the A1 and the B1 sequences that the sum of the autocorrelation functions is zero for all lags except for the zero lag.

The A1 and A2 sequences and the B1 and B2 sequences have been chosen such that the sum of the cross correlation function of the A1 and A2 sequences and the cross correlation function of the B1 and B2 sequences is zero for all lags thereby eliminating or substantially reducing interference between the first and second ultrasonic paths.

Although in the examples, the first and second codes are binary codes, these binary codes may be used to phase code a carrier wave, so that the transmitted signal is a phase coded binary waveform.

The received signal is typically digitized using a fast analog-to-digital converter (ADC). The ADC may have 8 or 10 bits of resolution, corresponding to 256 or 1024 discrete levels. The digital signal is then used to obtain the correlation function with the transmitted signal.

Figure 4:
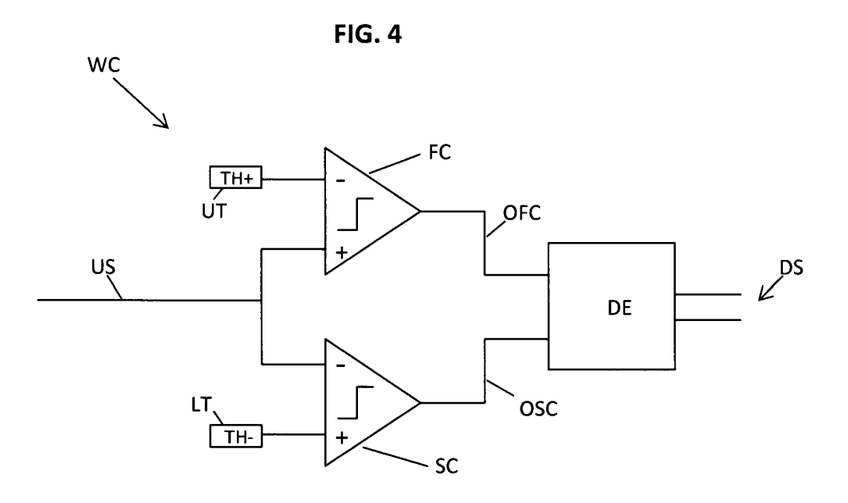
FIG. 4: depicts a window comparator for digitizing a received ultrasonic signal.

In a preferred embodiment, the received signal is digitized using a window comparator WC as shown in FIG. 4. The window comparator comprises a first comparator FC and a second comparator SC. A received ultrasonic signal US is inputted to both the first and second comparator FC, SC, such that the first comparator FC outputs an indication OFC when the signal value of the received ultrasonic signal US is above an upper threshold UT, and such that the second comparator SC outputs an indication OSC when the signal value of the received ultrasonic signal US is below a lower threshold LT.

Figure 5:
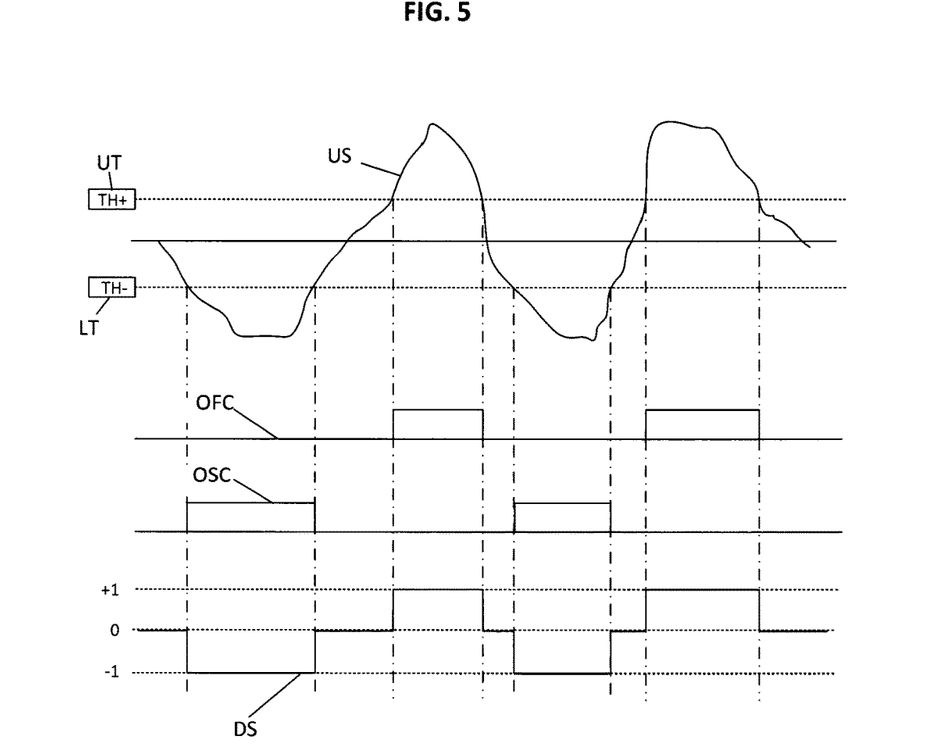
FIG. 5: depicts different signals in the window comparator when an exemplary received ultrasonic signal is inputted to the window comparator.

An example thereof is shown in FIG. 5. At the top of FIG. 5, an example of a received ultrasonic signal US is shown. This is an analog variable signal. The upper and lower thresholds UT, LT are also indicated, so that it is clearly shown when the signal value of the received ultrasonic signal US is above the upper threshold and when the signal value of the received ultrasonic signal US is bellow the lower threshold.

Below the received ultrasonic signal US, the output OFC of the first comparator FC is shown. The output OFC is low when the signal value of the received ultrasonic signal is below the upper threshold and high when the signal value of the received ultrasonic signal is above the upper threshold.

Below the output OFC, the output OSC of the second comparator is shown. The output OSC is low when the signal value of the received ultrasonic signal is above the lower threshold and high when the signal value of the received ultrasonic signal is below the lower threshold.

Referring to FIG. 4 again, the outputs OFC and OSC are inputted to a decoder DE which converts the received inputs into a digital signal DS having three signal levels, namely −1, 0 and +1, which can be represented by two bits. The resulting digital signal DS is also shown in FIG. 5 below the output OSC of the second comparator.

The advantage of using the digital signal DS for digital signal processing in order to obtain the correlation function is that the digital signal DS is a normalized signal having amplitude 1. Hence, when such a signal is used in multiplication with another signal having the same property, the product is a signal having the same amplitude which can thus be also represented by two bits. Hence, multiplication can be done much more efficient. Hence, the digital signal processing can be done more quickly which has the advantage that lower cost, lower power processing elements, e.g. FPGA's can be used.

Further, this embodiment has the advantage that comparators are lower cost and lower power than the required ADC's.

The use of the window comparator is especially interesting when the first code and the second code used to be transmitted along the first and second ultrasonic path respectively are relatively long. When the received ultrasonic signal is converted into a signal having only three signal levels, accuracy may be lost, but this is then compensated for by using a long code due to the fact that a longer transmitted code improves accuracy. Hence, the inventors have found that the resulting correlation function using a window comparator can be very similar to the correlation function obtained using a conventional ADC.

In order to calculate the flow rate, it is necessary to determine the time difference between the transit time of an upstream transmission and the transit time of a downstream transmission. The time difference may be referred to as delta-t. By having one pair of transducers transmitting in an upstream direction and a second pair transmitting in a downstream direction it is possible to calculate the delta-t from the resulting transit time measurements.

However, due to systematic differences in transit time between the two paths there may be an error in the delta-t measurement. In order to eliminate the delta-t error, the direction of transmission of each pair of transducers may be alternated periodically. For example, if a systematic error of +δT in the delta-t calculation exists in one direction, a systematic error of −δT will exist in the alternate direction. The systematic error may be measured and included as a correction in the average delta-t calculation, or eliminated by averaging two or more transmissions in alternate directions. Typically the period between alternating direction of transmission depends on the length of the transmitted code sequences.

Figure 6:
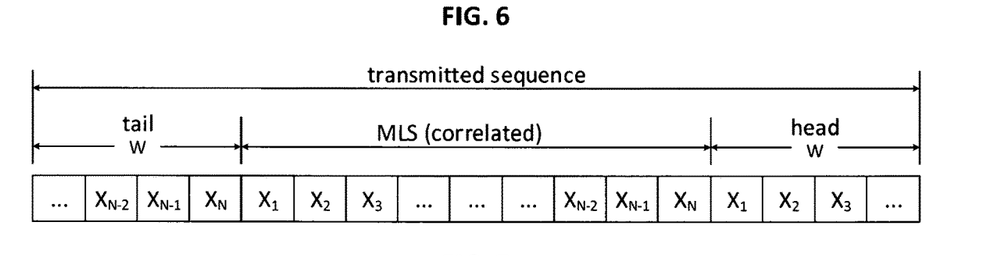
FIG. 6: depicts schematically an extended maximal length sequence code suitable to be transmitted by an ultrasonic flowmeter according to an embodiment of the invention.

FIG. 6 depicts an extended maximal length sequence code referred to as 'transmitted sequence' in FIG. 6 consisting of a single maximum length sequence MLS extended in the beginning by a tail and in the end by a head. The maximum length sequence MLS has a length N determined by $(2^m-1)$, where m is the number of bits of a single binary number of the sequence. A binary number of the sequence is denoted X so that the single maximum length sequence MLS consists of N binary numbers ranging from $X_1$ to $X_N$. The tail consists of the last n elements of the maximum length sequence MLS and the head consists of the first n elements of the maximum length sequence MLS.

An ultrasonic flowmeter is generally specifically designed for one or more specific applications so that a predetermined measurement range can be set corresponding to a predetermined difference W between minimum and maximum values of the transit times expected to occur in the ultrasonic flowmeter. The time period to transmit the head and tail of the extended maximal length sequence code in FIG. 6 is equal to difference W. In other words, n is chosen such that a time to transmit n elements of the code is equal to the time period W.

Figure 7:
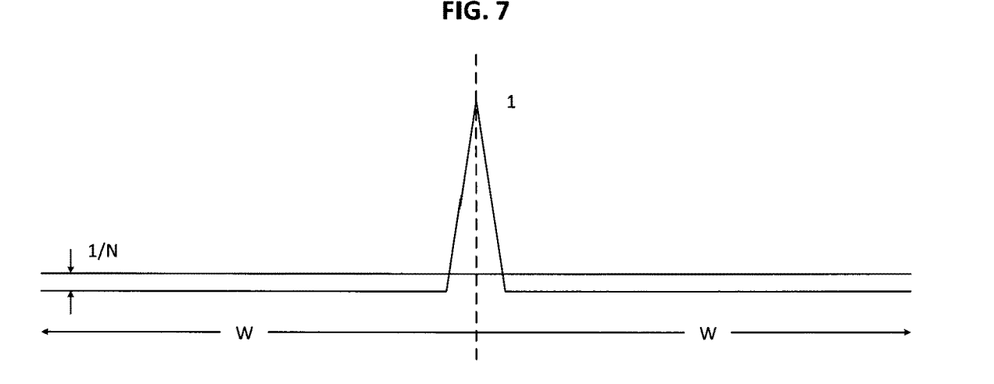
FIG. 7: depicts a correlation function for the extended maximal length sequence code of FIG. 6.

FIG. 7 depicts a correlation function of the maximum length sequence MLS, i.e. the extended maximal length sequence code without the extensions 'tail' and 'head', with the extended maximal length sequence code for a lag of −W to a lag of +W. The advantage of the extended maximal length sequence code is that the correlation function is guaranteed at most 1/N for non-zero lags in the range −W to +W, the range of interest for the ultrasonic flowmeter. Outside the range −W to =W, this cannot be guaranteed, but this is also not necessary as no measurements will in principle fall outside said range.

Hence, when using two such extended maximal length sequence codes, the first code may be an extended maximum length sequence code consisting of a single maximum length sequence extended in the beginning by the last n elements of the maximum length sequence and in the end by the first n elements of the maximum length sequence, and the second code may be the same maximum length sequence delayed sufficiently to avoid overlapping of the first and second code during a measurement period of interest and similarly extended in the beginning and end, wherein the first and second ultrasonic signal are correlated with respectively the transmitted first and second code without the extensions. Alternatively, the first code may be an extended maximum length sequence code consisting of a single first maximum length sequence extended in the beginning by the last n elements of the first maximum length sequence and in the end by the first n elements of the first maximum length sequence, and the second code may be another extended maximum length sequence code consisting of a single second maximum length sequence different from the first maximum length sequence and extended in the beginning by the last p elements of the second maximum length sequence and in the end by the first p elements of the second maximum length sequence, wherein the first and second ultrasonic signal are correlated with respectively the transmitted first and second code without the extensions.

In case of similar, but delayed first and second codes, n is chosen such that a time to transmit n elements of the first or second code exceeds a predetermined time period defining a desired difference between minimum and maximum values of the first and second transit times.

In case of different first and second codes, n and p are chosen such that a time to transmit n elements of the first code and a time to transmit p elements of the second code exceed a predetermined time period defining a desired difference between minimum and maximum values of the first and second transit times.

Although the above specification only indicates a flow without specifying what kind of flow, the invention can be applied to any application in which ultrasonic measurements are possible. Hence, the flow may be gas flow, a liquid flow or a mixed flow. Even application in a high-viscous flow is envisaged.

The invention claimed is:

1. A method to control an ultrasonic flowmeter, wherein the ultrasonic flowmeter comprises:
   a pipe segment to receive a flow therethrough;
   a first pair of transducers defining a first ultrasonic path in the pipe segment to be subjected to the flow;
   a second pair of transducers defining a second ultrasonic path in the pipe segment to be subjected to the flow, wherein the second ultrasonic path is different from the first ultrasonic path, and
   wherein the method comprises the following steps:
   a) driving a transducer of the first pair of transducers to transmit a first code;
   b) receiving a first ultrasonic signal at the other transducer of the first pair of transducers;

c) simultaneously driving a transducer of the second pair of transducers to transmit a second code, wherein the first code and the second code are non-correlated to each other;

d) receiving a second ultrasonic signal at the other transducer of the second pair of transducers;

e) correlating the transmitted first code with the first ultrasonic signal; and f) correlating the transmitted second code with the second ultrasonic signal.

2. The method according to claim 1, wherein the first ultrasonic path defines a first transit time being the time period for an ultrasonic wave to travel between the first pair of transducers, wherein the second ultrasonic path defines a second transit time being the time period for an ultrasonic wave to travel between the second pair of transducers, and wherein the first and second code are transmitted for a period of time equal to at least the largest of the first and second transit times.

3. The method according to claim 2, wherein the first and second code are transmitted for a period of time equal to at least twice the largest of the first and second transit times.

4. The method according to claim 2, wherein the first and second code are transmitted for a period of time equal to at least triple the largest of the first and second times.

5. The method according to claim 1, wherein the first code is a part of a maximum length sequence code, and wherein the second code is another part of the maximum length sequence code, preferably not overlapping with the part of the maximum length sequence code forming the first code.

6. The method according to claim 1, wherein the first code is a maximum length sequence code, and wherein the second code is the same maximum length sequence code delayed sufficiently to avoid overlapping of the first and second code during a measurement period of interest.

7. The method according to claim 1, wherein the first code is an extended maximum length sequence code consisting of a single maximum length sequence extended in the beginning by the last n elements of the maximum length sequence and in the end by the first n elements of the maximum length sequence, and wherein the second code is the same maximum length sequence delayed sufficiently to avoid overlapping of the first and second code during a measurement period of interest and similarly extended in the beginning and end, and wherein the first and second ultrasonic signal are correlated with respectively the transmitted first and second code without the extensions.

8. The method according to claim 7, wherein the first ultrasonic path defines a first transit time being the time period for an ultrasonic wave to travel between the first pair of transducers, wherein the second ultrasonic path defines a second transit time being the time period for an ultrasonic wave to travel between the second pair of transducer, and wherein n is chosen such that a time to transmit n elements of the first or second code exceeds a predetermined time period defining a desired difference between minimum and maximum values of the first and second transit times.

9. The method according to claim 1, wherein the first code is a maximum length sequence code, and wherein the second code is another maximum length sequence code.

10. The method according to claim 1, wherein the first code is an extended maximum length sequence code consisting of a single first maximum length sequence extended in the beginning by the last n elements of the first maximum length sequence and in the end by the first n elements of the first maximum length sequence, and wherein the second code is another extended maximum length sequence code consisting of a single second maximum length sequence different from the first maximum length sequence and extended in the beginning by the last p elements of the second maximum length sequence and in the end by the first p elements of the second maximum length sequence, and wherein the first and second ultrasonic signal are correlated with respectively the transmitted first and second code without the extensions.

11. The method according to claim 10, wherein the first ultrasonic path defines a first transit time being the time period for an ultrasonic wave to travel between the first pair of transducers, wherein the second ultrasonic path defines a second transit time being the time period for an ultrasonic wave to travel between the second pair of transducer, and wherein n and p are chosen such that a time to transmit n elements of the first code and a time to transmit p elements of the second code exceed a predetermined time period defining a desired difference between minimum and maximum values of the first and second transit times.

12. The method according to claim 1, wherein the first and second codes are formed by pairs of sequences that have the property that their out-of-phase aperiodic autocorrelation coefficients sum to zero.

13. The method according to claim 12, wherein the pair of sequence forming the first code and the pair of sequence forming the second code are different from each other and preferably selected such that the cross correlations between respective pairs of sequences sum to zero.

14. The method according to claim 1, wherein the transmitted first code, the first ultrasonic signal, the transmitted second code and the second ultrasonic signal are first digitized into three levels −1, 0 and +1 prior to correlating.

15. The method according to claim 1, wherein a direction of transmission on the first and/or second ultrasonic path is alternated periodically.

16. An ultrasonic flowmeter comprising:
a pipe segment to receive a flow;
a first pair of transducers defining a first ultrasonic path in the pipe segment to be subjected to the flow;
a second pair of transducers defining a second ultrasonic path in the pipe segment to be subjected to the flow, wherein the second ultrasonic path is different from the first ultrasonic path;
a controller to control the first and second pair of transducers,
wherein the controller is configured to drive a transducer of the first pair of transducers with a first code and simultaneously drive a transducer of the second pair of transducers with a second code, wherein the first code and the second code are not correlated to each other.

17. The ultrasonic flowmeter according to claim 16, wherein the first ultrasonic path defines a first transit time being the time period for an ultrasonic wave to travel between the first pair of transducers, wherein the second ultrasonic path defines a second transit time being the time period for an ultrasonic wave to travel between the second pair of transducers, and wherein the controller is configured to transmit the first and second code for a period of time equal to at least the largest of the first and second transit times.

18. The ultrasonic flowmeter according to claim 17, wherein the controller is configured to transmit the first and second code for a period of time equal to at least twice the largest of the first and second transit times.

19. The ultrasonic flowmeter according to claim 17, wherein the controller is configured to transmit the first and second code for a period of time equal to at least triple the largest of the first and second transit times.

20. The ultrasonic flowmeter according to claim 16, wherein the first code is a part of a maximum length sequence code, and wherein the second code is another part of the maximum length sequence code, preferably not overlapping with the part of the maximum length sequence code forming the first code.

21. The ultrasonic flowmeter according to claim 16, wherein the first code is a maximum length sequence code, and wherein the second code is the same maximum length sequence code, delayed sufficiently to avoid overlapping the first and second code during a measurement period of interest.

22. The ultrasonic flowmeter according to claim 16, wherein the first code is an extended maximum length sequence code consisting of a single maximum length sequence extended in the beginning by the last n elements of the maximum length sequence and in the end by the first n elements of the maximum length sequence, and wherein the second code is the same maximum length sequence delayed sufficiently to avoid overlapping of the first and second code during a measurement period of interest and similarly extended in the beginning and end, and wherein the controller is configured to correlate a first ultrasonic signal received at the other transducer of the first pair of transducers with the transmitted first code without the extensions, and to correlate a second ultrasonic signal received at the other transducer of the second pair of transducers with the transmitted second code without the extensions.

23. The ultrasonic flowmeter according to claim 22, wherein the first ultrasonic path defines a first transit time being the time period for an ultrasonic wave to travel between the first pair of transducers, wherein the second ultrasonic path defines a second transit time being the time period for an ultrasonic wave to travel between the second pair of transducer, and wherein n is chosen such that a time to transmit n elements of the first or second code exceeds a predetermined time period defining a desired difference between minimum and maximum values of the first and second transit times.

24. The ultrasonic flowmeter according to claim 16, wherein the first code is a maximum length sequence code, and wherein the second code is another maximum length sequence code.

25. The ultrasonic flowmeter according to claim 16, wherein the first code is an extended maximum length sequence code consisting of a single first maximum length sequence extended in the beginning by the last n elements of the first maximum length sequence and in the end by the first n elements of the first maximum length sequence, and wherein the second code is another extended maximum length sequence code consisting of a single second maximum length sequence different from the first maximum length sequence and extended in the beginning by the last p elements of the second maximum length sequence and in the end by the first p elements of the second maximum length sequence, and wherein the controller is configured to correlate a first ultrasonic signal received at the other transducer of the first pair of transducers with the transmitted first code without the extensions, and to correlate a second ultrasonic signal received at the other transducer of the second pair of transducers with the transmitted second code without the extensions.

26. The ultrasonic flowmeter according to claim 25, wherein the first ultrasonic path defines a first transit time being the time period for an ultrasonic wave to travel between the first pair of transducers, wherein the second ultrasonic path defines a second transit time being the time period for an ultrasonic wave to travel between the second pair of transducer, and wherein n and p are chosen such that a time to transmit n elements of the first code and a time to transmit p elements of the second code exceed a predetermined time period defining a desired difference between minimum and maximum values of the first and second transit times.

27. The ultrasonic flowmeter according to claim 16, wherein the first and second codes are formed by pairs of sequences that have the property that their out-of-phase aperiodic autocorrelation coefficients sum to zero.

28. The ultrasonic flowmeter according to claim 27, wherein the pair of sequence forming the first code and the pair of sequence forming the second code are different from each other and preferably selected such that the cross correlations between respective pairs of sequences sum to zero.

29. The ultrasonic flowmeter according to claim 16, wherein the controller is further configured to digitize the transmitted first code, the first ultrasonic signal, the transmitted second code and the second ultrasonic signal first into three levels −1, 0 and +1 prior to correlating.

30. The ultrasonic flowmeter according to claim 16, wherein the controller is further configured to periodically alternate a direction of transmission on the first and/or second ultrasonic path.

31. A flow system comprising one or more ultrasonic flowmeters, each ultrasonic flowmeter comprising:
   a pipe segment to receive a flow;
   a first pair of transducers defining a first ultrasonic path in the pipe segment to be subjected to the flow;
   a second pair of transducers defining a second ultrasonic path in the pipe segment to be subjected to the flow, wherein the second ultrasonic path is different from the first ultrasonic path;
   a controller to control the first and second pair of transducers,
   wherein the controller is configured to drive a transducer of the first pair of transducers with a first code and simultaneously drive a transducer of the second pair of transducers with a second code, wherein the first code and the second code are not correlated to each other.

* * * * *